Patented July 10, 1951

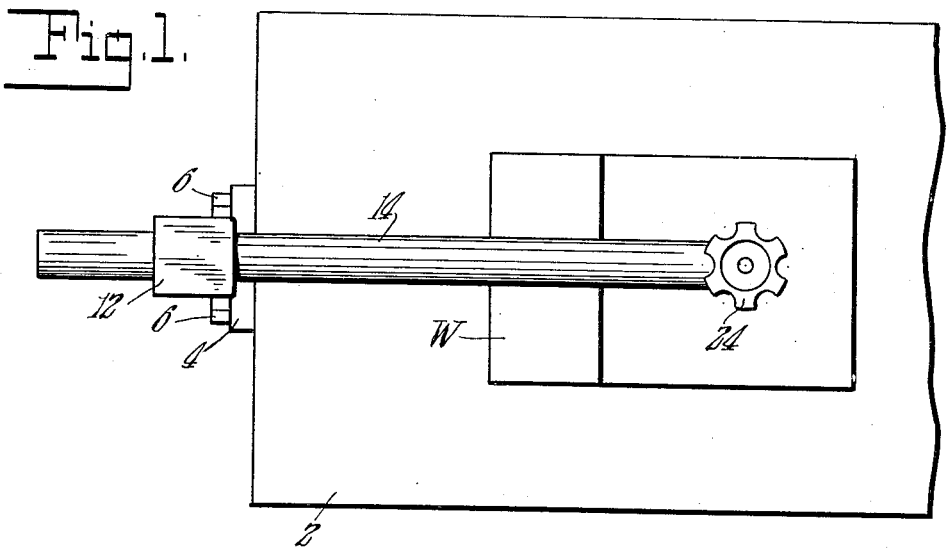
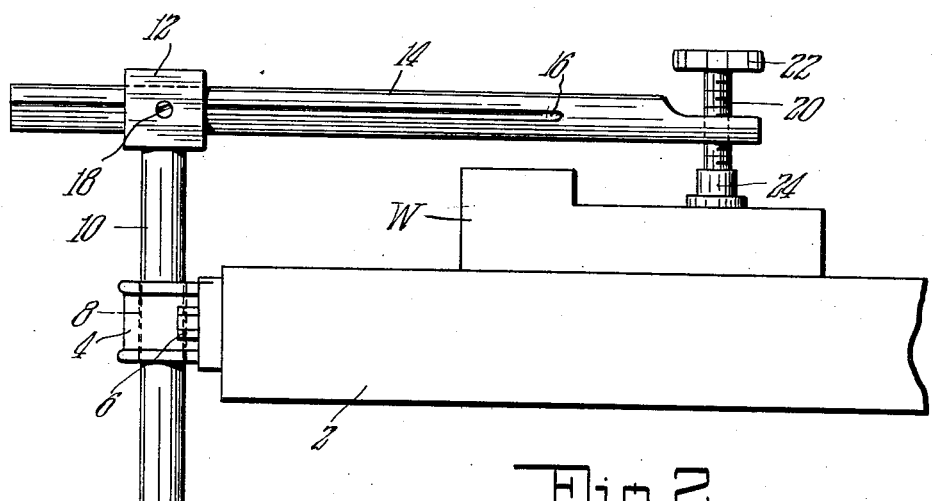

2,559,716

UNITED STATES PATENT OFFICE 2,559,716

CLAMP

Alfred E. Gaudreau, Springfield, Mass.

Application July 27, 1949, Serial No. 107,019

2 Claims. (Cl. 77—63)

This invention relates to improvements in machine tools and is directed more particularly to clamps for securing a piece of work to the table or other work supporting member of a machine.

The principal objects of the invention is the provision of a clamp for clamping or securing a piece of work to the work support such as the table, or slide of a machine tool, or the like.

The device of the invention is not only simple in form so as to be economical to manufacture but is efficient in operation, and is readily and easily associated with a work supporting member for clamping work thereto.

The clamp of the invention has many and various uses, but is particularly adapted for use in connection with machine tools of various types where it may be employed for clamping a piece of work to a support for a machine operation such as boring, drilling, tapping, reaming or any other operation where the work must be rigidly and securely held against shifting.

The novel clamp is constructed and arranged for accommodation for the work to be clamped. That is, it is not necessary to locate the work for the accommodation of the clamp. The clamp is readily manipulatable.

All of the above objects I accomplish by means of such structure and relative arrangement of parts thereof, as will fully appear by a perusal of the description below and by the various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of a clamp embodying the novel features of the invention; and Fig. 2 is a side elevational view of the clamp shown in Fig. 1.

Referring now to the drawing more in detail, and referring more particularly to the preferred form of my invention selected for illustrative purposes, my invention will be fully described.

As set forth the clamp of the invention may be used with various types of machine tools and for purposes of disclosure a work support 2 is shown which may represent the table, slide or the like of a machine tool on which a piece of work supported thereby is clamped.

A piece of work is represented by W which may obviously take various forms and on which some form of operation is to be performed such as drilling, tapping, reaming, counterboring or the like.

A bracket 4 is provided which may take any desired form for attaching or securing to a machine. In the form of the invention shown the bracket is secured to the support 2 by screw means such as 6, but any other means may be employed. As an important feature the bracket is provided with a bore or socket 8. Any other form of bracket having the socket or bore may be employed.

A post 10 is reciprocable up and down and rotatable or swingable in the bore of the bracket and in the form of the invention it has a head 12 fixed to its upper end.

An arm 14 is slidable back and forth in a suitable bore of the head 12 and its longitudinal axis is preferably angular relative to that of the said post 10.

The arm 14 is provided with a longitudinally extending spline or key way 16 and said head has a projection or key-like member in said spline to prevent rotative movements of said arm. The projection may take any form but for purposes of disclosure a set-screw is shown at 18.

As is shown the members 10 and 14 are round in cross section but they may be of any other desired cross section and also if desired the arm and post may be fixed or secured together against relative movements.

A clamp screw 20 threadedly engages the outer free end of the arm 14 and has manually engageable means such as a hand wheel 22 on its upper end.

The lower end of the member 20 is provided with a foot or pad 24 for bearing on a piece or work and may be formed from various materials to have any desired size.

With the clamp associated with a work support and a piece of work on the support the screw 20 is run down so that the foot 24 thereof bears on the work. The arm may be swung and moved back and forth to locate the screw, that part of the work piece desired.

The post being slidable in the bracket 4 the arm 14 may be positioned so that little movement of the screw is necessary to bring the foot onto the work.

As pressure is applied to the work by the screw the outer end of the arm 14 is tilted so as to cant the post 10 in the socket 8 of the bracket 4. Due to the pressure applied to the work the post binds in the bore of the bracket so that it will not move upwardly therein and any desired clamping pressure may be applied to the work. Thereby the work is readily and easily immovably clamped to the work support.

By backing off on the clamp screw the clamp may be readily and easily moved up or down and positioned as desired. It is possible to accommodate the clamp to the position of the work on the support therefor and it is not necessary to shift the work to accommodate the clamp.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Clamp apparatus for clamping a work piece to the horizontal work supporting surface of a work support having a vertical side comprising in combination, a bracket for securement to the vertical side of the support provided with a vertically disposed bore for a post, an elongated post slidable up and down and rotatable in opposite directions in the bore of said bracket, a head fixed to the upper end of said post provided with a bore having a longitudinal axis disposed at right angles to the longitudinal axis of said post, an elongated arm reciprocable in said bore of the head for overlying the supporting surface and having outer and inner ends and provided with an elongated keyway, a member in said head engaging said keyway to prevent rotation of said arm in said head, and a clamp screw threadedly engaging the inner end of said arm having a longitudinal axis in substantial parallelism with that of said post and provided at its lower end with a member for bearing on work on said supporting surface and at its upper end with a manually engageable member for actuating the same, the transverse dimension of said post relative to the diameter of the bore of the bracket being such that as pressure is applied to work by the screw the inner end of the arm is elevated so as to tilt and bind the post in the bore of the bracket against movement.

2. Clamp apparatus for clamping a work piece to the work supporting surface of a work support comprising in combination, a bracket for securement to the vertical side of the work support provided with a vertically disposed bore for a post, an elongated post slidable up and down and rotatable in opposite directions in the bore of said bracket, a head fixed to the upper end of said post provided with a bore having a longitudinal axis, an elongated arm reciprocable in the bore of said head for overlying the supporting surface and having outer and inner ends and provided with an elongated keyway, a member in said head engaging the keyway to prevent rotation of said arm, and a clamp screw threadedly engaging the inner end of said arm having a longitudinal axis in substantial parallelism with that of said post and provided at its lower end with a member for bearing on work on the supporting surface and at its upper end with a manually engageable member for actuating the same, all adapted and arranged so that as pressure is applied to work by said screw the inner end of said arm is elevated so as to tilt and bind said post in the bore of said bracket against movement.

ALFRED E. GAUDREAU.

REFERENCES CITED

The following references are of record in the file of this patent:

UNITED STATES PATENTS

| Number | Name | Date |
|---|---|---|
| 544,402 | Crane | Aug. 13, 1895 |
| 1,559,263 | Lacey | Oct. 27, 1925 |
| 2,271,532 | Allmendinger | Feb. 3, 1942 |

FOREIGN PATENTS

| Number | Country | Date |
|---|---|---|
| 269,395 | Germany | Oct. 2, 1912 |